(12) United States Patent
Schippmann

(10) Patent No.: US 6,809,431 B1
(45) Date of Patent: Oct. 26, 2004

(54) CONTROL LOGIC FOR A WIND ENERGY SYSTEM

(75) Inventor: Hugo L. Schippmann, Luebeck (DE)

(73) Assignee: DeWind AG, Luebeck (DE)

( * ) Notice: Subject to any disclaimer, the term of this patent is extended or adjusted under 35 U.S.C. 154(b) by 0 days.

(21) Appl. No.: 09/806,098

(22) PCT Filed: Sep. 25, 1999

(86) PCT No.: PCT/EP99/07142

§ 371 (c)(1),
(2), (4) Date: May 3, 2001

(87) PCT Pub. No.: WO00/19094

PCT Pub. Date: Apr. 6, 2000

(30) Foreign Application Priority Data

Sep. 26, 1998 (DE) ......................................... 198 44 258

(51) Int. Cl.[7] .............................. F03D 9/00; H02P 9/04
(52) U.S. Cl. .......................................... 290/55; 290/44
(58) Field of Search ........................ 290/44, 55; 415/7, 415/2.1, 4.2; 60/641.11, 641.12

(56) References Cited

U.S. PATENT DOCUMENTS

| 4,703,189 A | * | 10/1987 | DiValentin et al. | ........... 290/44 |
| 5,616,963 A | * | 4/1997 | Kikuchi | ........................ 290/55 |
| 5,907,192 A | * | 5/1999 | Lyons et al. | .................. 290/42 |

FOREIGN PATENT DOCUMENTS

| DE | 195 32 409 A | 3/1997 |
| FR | 1 065 816 A | 5/1954 |
| WO | 93/11604 | 6/1993 |

OTHER PUBLICATIONS

Leithead et al.: "Role and Objectives of Control for Wind Turbines", IEE Proceedings C. Generation, Transmission Distribution GB Institution of Electrical, Engineers, Stevenage, vol. 138, No. 2 Part C, pp. 135–148, pp 1245–146.

* cited by examiner

Primary Examiner—Nicholas Ponomarenko
Assistant Examiner—Julio C. Gonzalez
(74) Attorney, Agent, or Firm—Michael J. Striker

(57) ABSTRACT

A wind energy system, having a wind-drivable rotor (3) with angularly adjustable rotor blades (4), a generator, connected directly or indirectly to the rotor, for generating electrical energy, in which the power output of the generator is possible at variable rotor rpm, and a facility management system, which is embodied, within a predetermined wind speed range, to regulate the rotor rpm by adjustment of the rotor blade angles and to turn off the operation of the system above a shutoff speed, can advantageously be produced economically, with economies of material and energy costs, if the facility management system is embodied to regulate the rotor rpm and the power output downward, by adjustment of the rotor blade angles, in a range between a predetermined limit speed and the shutoff speed.

4 Claims, 2 Drawing Sheets

CONTROL LOGIC FOR A WIND ENERGY SYSTEM

Figure 1:
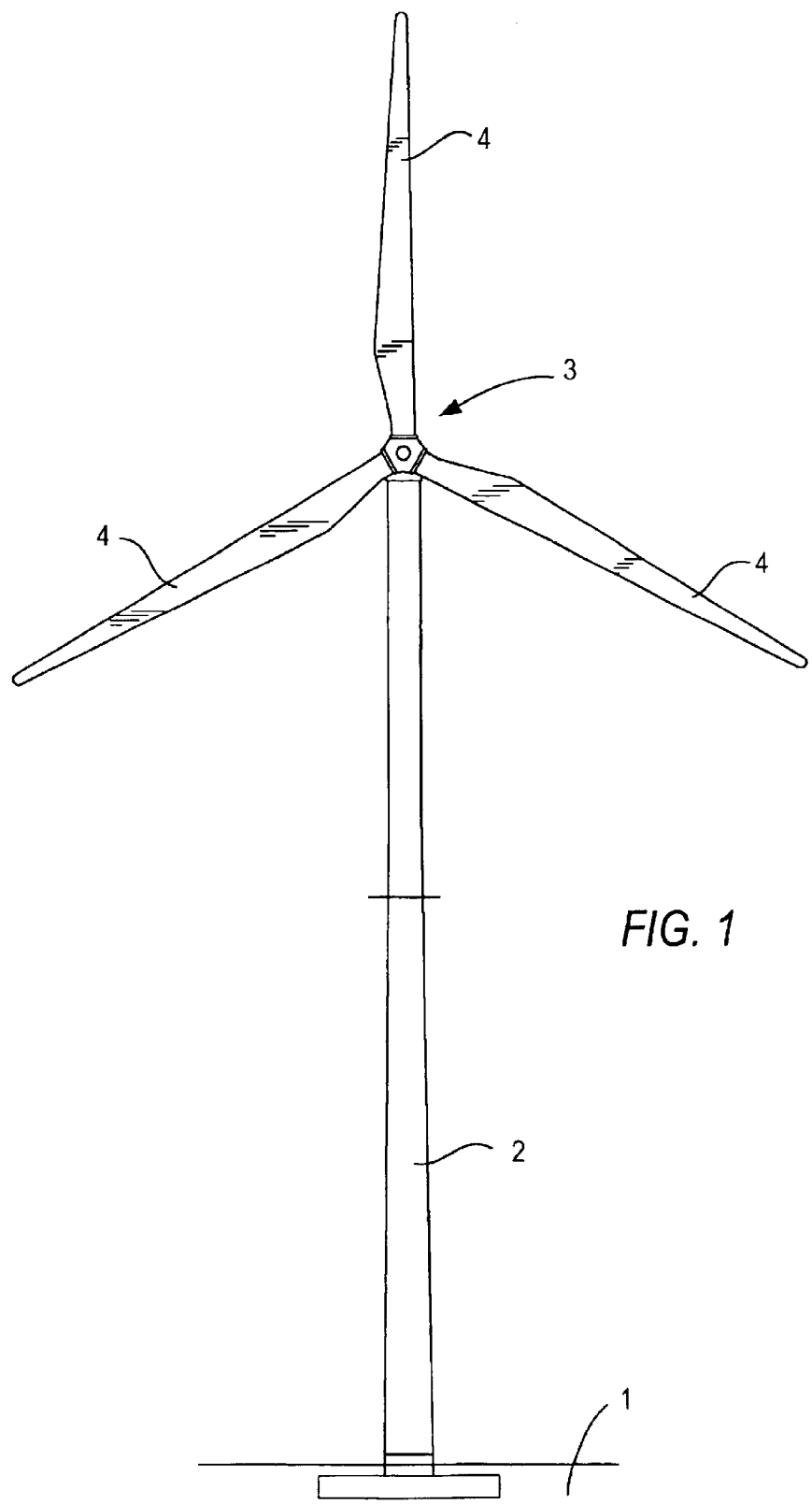

The invention relates to a wind energy system, having a wind-drivable rotor with angularly adjustable rotor blades, a generator, connected directly or indirectly to the rotor, for generating electrical energy, in which the power output of the generator is possible at variable rotor rpm, and a facility management system, which is embodied, within a predetermined wind speed range, to regulate the rotor rpm by adjustment of the rotor blade angles and to turn off the operation of the system above a shutoff speed.

One such wind energy system is known from International Patent Disclosure WO93/11604, for instance. Such wind energy systems, which use variable rotor rpm and variable rotor blade angles, produce more electrical energy than systems that use a single fixed rotor rpm and fixedly specified rotor blade angles. Typically, a variable rpm is used in the range of very low wind speeds, and the rotor blades assume a large angle relative to the incident wind, which angle is only slightly smaller than 90°. As the wind speed increases, this rotor blade angle is initially not changed, until the wind speed suffices to turn the rotor at rated rpm, and then the wind energy system produces its rated power. Accordingly, beginning at a very low power at a minimum wind speed, the power output increases along with the rotor rpm, until the rated power is reached. If the wind speed increases further, the rated power and the rated rpm are then kept as constant as possible, in that the rotor blades are adjusted farther and farther in the direction of the wind until the wind speed rises above a shutoff speed. Here the wind energy system is turned off, by rotating the rotor blades entirely in the direction of the wind, so that the rotor blade angles relative to the wind direction amount to approximately zero degrees. This brakes the rotor. The shutoff at very high wind speeds is necessary because the load on the wind energy system in operation under strong wind conditions, especially gusts, can become so great that damage occurs.

In known wind energy systems, the rotor rpm is regulated to be constant until the shutoff speed is reached, and then the rated power is output. If the shutoff speed is exceeded, the rotor rpm is regulated downward to zero, by adjusting the rotor blade angles to the feathered pitch. These wind energy systems must naturally be dimensioned so robustly that they can still be operated at rated power and rated rpm until the shutoff speed is reached.

The object of the invention is to disclose a wind energy system of the type defined at the outset that can be less robustly dimensioned and is more economical to produce.

The invention attains this object in that the facility management system is embodied to regulate the rotor rpm and the power output downward, by adjustment of the rotor blade angles, in a range between a predetermined limit speed and the shutoff speed. Because of the regulation according to the invention, the load on the wind energy system at wind speeds above the limit speed is kept approximately constant or even reduced, so that the dimensioning of the wind energy system need not be adapted to the relatively high shutoff speed but instead only to the relatively low limit speed. The less robustly dimensioned wind energy system can be manufactured much less expensively, at considerable savings of material and energy. The loss in produced electrical energy is negligibly slight, because of the power output that is reduced in the range between the limit speed and the shutoff speed, since wind speeds in this range, at central European sites, occur relatively rarely, and thus the wind energy system of the invention, on average over the year, produces virtually no less energy than the known systems.

To achieve an optimal energy yield at various wind speeds, it is proposed that the facility management system, at adequate wind speeds below the predetermined limit speed, is embodied to regulate the power output essentially to the value of the rated power of the system. In this wind speed range, the load on the wind energy system is still relatively slight, and so the power output can be regulated up to the highest continuous duty without reservation.

In a further feature of the invention, it is provided that the facility management system is embodied so as to regulate the power output, beginning at the rated power, steadily decreasingly down to the shutoff speed, with increasing wind speed above the predetermined limit speed]. This provision assures the highest possible power output without exceeding the maximum allowable mechanical load on the wind energy system. In particular, the regulation can be embodied such that the mechanical load at every wind speed, within the aforementioned speed range, remains constant.

In a first approximation, the load that increases with the wind speed can be compensated for by a proportional reduction in the rotor rpm, so that the total load remains essentially constant. A simply embodiment of the invention therefore comprises the provision that the facility management system is embodied to regulate the power output and the rotor rpm as much as possible constantly to the rated power/rated rpm below the predetermined limit speed, and above the limit speed to regulate it substantially linearly decreasingly down to the shutoff speed. With this very simple regulation strategy, for a given load capacity of the wind energy system, an optimum of electrical energy can be produced.

In a preferred embodiment of the invention, it is provided that the facility management system is embodied to regulate the power output to approximately 40% of the rated power at the shutoff speed. In this regulation, until the shutoff speed is reached, still a relatively large amount of electrical energy is produced. At the usual structural size of wind energy systems with electrical rated powers of approximately 1 megawatt, especially economic operation is achieved if the facility management system is embodied to regulate the power output to the rated power, in the wind speed range from approximately 11.5 m/s to approximately 16 m/s. In such wind energy systems, the dimensioning can advantageously be kept slight if the limit speed is approximately 16 m/s and the shutoff speed is approximately 23 m/s.

The subject of the invention is also a method for regulating the power output of a wind energy system in accordance with the above description.

One exemplary embodiment of the invention will described below in further detail in conjunction with the drawings.

Figure 2:
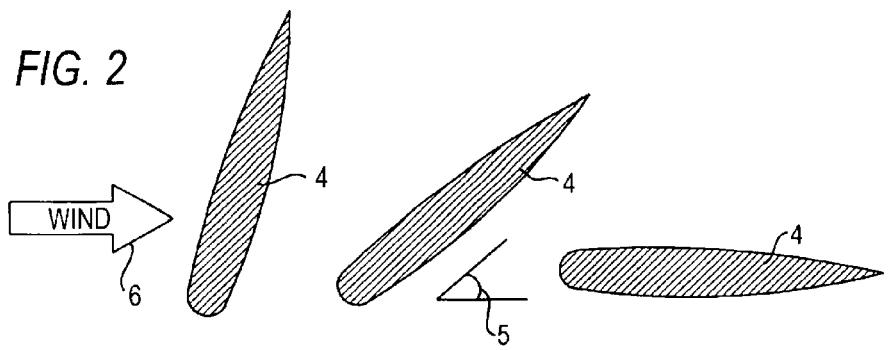
Figure 3:
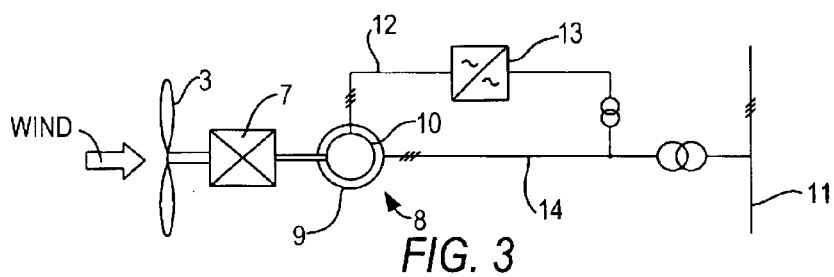
Figure 4:
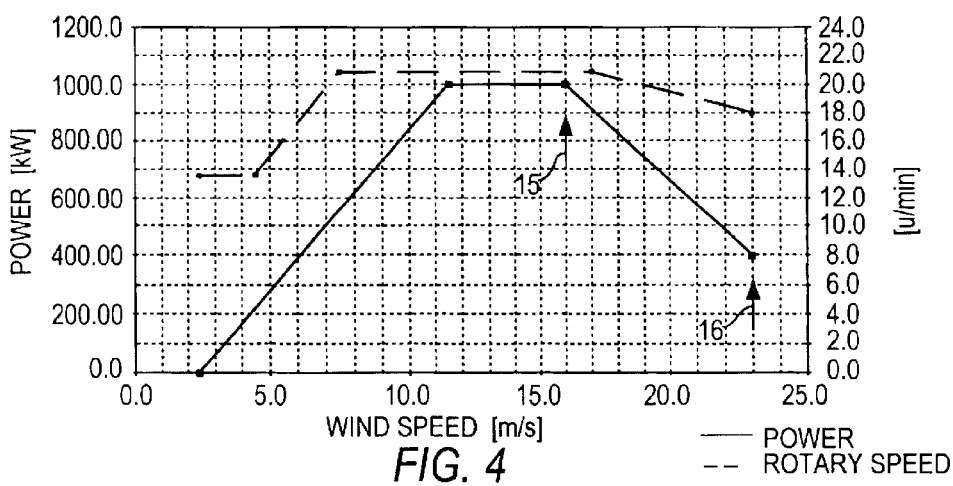

The drawings individually show the following:

FIG. 1: a plan view on a wind energy system;

FIG. 2: an angularly adjustable rotor blade in section;

FIG. 3: a schematic illustration of the mode of operation of the wind energy system;

FIG. 4: a graph showing the courses, regulated according to the invention, of the rotor rpm and the output power as a function of the wind speed.

The wind energy system shown, according to the invention, has a mast (2) anchored in the ground (1) and a rotor (3), mounted on the top of the mast (2), with three rotor blades (4). As shown in FIG. 2, the rotor blade angles (5) are embodied adjustably relative to the wind direction (6). As seen from the schematic illustration in FIG. 3, the rotor (3) is mechanically connected via a gear (7) to an electric asynchronous generator (8). The stator (9) of the generator (8) is connected electrically to the power grid (11). The grid frequency and the frequency generated in the stator are synchronized with one another. The rotor (10) of the generator (8) is supplied with electricity via the lines (12) from a frequency converter (13), which in turn is connected to the lines (14) between the stator (9) and the grid (11). With the aid of the variable-frequency rotor currents generated by the frequency converter (13), a rotary field that rotates at the grid frequency can be generated in the rotor (10) despite the variable rotor speed; the frequency of the currents generated in the stator (9) are synchronized with the grid frequency. The power output of the generator (8) is thus possible at a variable rotor rpm.

The power output by the generator (8) to the grid (11), the rotor rpm, and the setting of the rotor blade angles, are monitored and regulated by a facility management system, not shown. FIG. 4 shows the course of regulation according to the invention of the output power and the rotor rpm, as a function of the wind speed.

The operation of the wind energy system is started as soon as a minimum wind speed of 2.5 m/s or more occurs, at which a rotor speed of 14 rpm is attained. With increasing wind speed, the rotor rpm increases, until the rated rotary speed of approximately 21 rpm is reached. This is the case approximately at a wind speed of 7.5 m/s. In the range of variable rotor speed, the rotor blade angles (5) are set to be quite steep, amounting to approximately 70° to 80° relative to the wind direction (6).

At higher wind speeds than 7.5 m/s, the rotor blade angles are set at about 21 m/s, the rotor rpm remains constant. The facility management system regulates the frequency and intensity of the currents imposed on the rotor (10) of the generator (8) in such a way that the power output to the grid (11) by the generator (8) increases steadily. Beyond a wind speed of about 11.5 m/s, the rated power of 1 megawatt is reached. The rated power must not be exceeded over a long term, and the facility management system is therefore embodied such that the output power is kept constantly at rated power; the rotor blade angles (5) are regulated such that the rotor rpm is also kept largely constant, at the rated rpm of about 21 rpm.

If the wind speed exceeds a limit speed (15) that is predetermined in the facility management system and in the case of the present wind energy system is on the order of 16 m/s, then the facility management system changes over to regulating the power output downward, in order to limit the mechanical load on the wind energy system, in particular the mast (2), rotor blades (4), gear (7), and generator (8). As a result of the load limitation, the aforementioned components of the wind energy system, and optionally others as well, can be dimensioned markedly less robustly than in systems that are operated at the rated power up to the shutoff speed (16).

Beginning at the rated power, the facility management system now regulates the power output linearly downward, at increasing wind speed above the predetermined limit speed (15), to the shutoff speed (16), and shortly before the shutoff speed (16) is reached, a power output of 400 kW is still possible. In the range between the limit speed (15) and the shutoff speed (16), the rotor speed is regulated downward from the rated rpm to 18 rpm, because the facility management system sets the rotor blade angles (5) to be smaller and smaller; the planes of the rotor blades are always oriented more in the direction of the wind speed. In the present case, the shutoff speed is 23 m/s. Here the rotor blades are put in the feathered pitch, as shown all the way to the right in FIG. 2, in which the rotor blades (4) are oriented in the wind direction (6) (rotor blade angle 5=0°). This causes the rotor (3) to come to a stop, and the wind energy system can be turned off.

List of Reference Numerals

1 Ground
2 Mast
3 Rotor
4 Rotor blade
5 Rotor blade angle
6 Wind direction
7 Gear
8 Asynchronous generator
9 Stator
10 Rotor
11 Grid
12 Lines
13 Frequency converter
14 Lines
15 Limit speed
16 Shutoff speed

What is claimed is:

1. A wind energy system, comprising a wind-drivable rotor (3) with angularly adjustable rotor blades (4); a generator (8) connected directly or indirectly to the rotor (3) for generating electrical energy, wherein power output of the generator (8) is possible at variable rotor rpm; and a control system, wherein said control system regulates the rotor rpm by adjustment of the rotor blade angles (5) and turns off the operation of the system above a shutoff speed (16) within a predetermined wind speed range, wherein the control system decreases the rotor rpm and the power output by adjustment of the rotor blade angles (5) in a range between a predetermined limit speed (15) and the shutoff speed (16), wherein the limit speed (15) is substantially 16 meters per second, wherein the control system regulates the power outlet essentially to a value of a rated power of the system at wind speeds below the predetermined limit speed (15), and wherein the control system regulates the power output, beginning at the rated power, constantly and decreasingly down to the shutoff speed (16) when wind speed increases above the predetermined limit speed (15).

2. The wind energy system of claim 1, wherein the control system regulates the power output and the rotor rpm approximately constantly to the rated power/rated rpm below the predetermined limit speed (15), and wherein above the limit speed (15), said control system regulates the power output substantially linearly and decreasingly down to the shutoff speed (16).

3. The wind energy system of claim 1, wherein the control system regulates the power output to the rated power in a wind speed range from approximately 11.5 meters per second to approximately 16 meters per second.

4. The wind energy system of claim 1, wherein the shutoff speed (16) is approximately 23 meters per second.

* * * * *